(No Model.)
C. E. BUCKLEY.
DEVICE FOR WATERING STOCK.
No. 445,920. Patented Feb. 3, 1891.
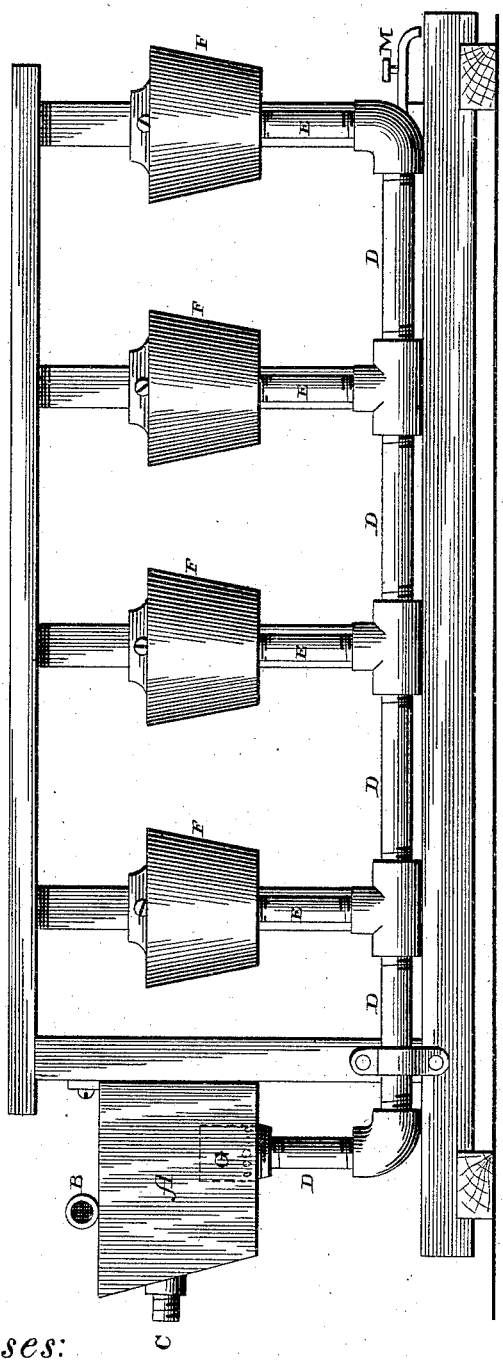
Witnesses:
E. P. Ellis,
D. Brockett,
Inventor:
C. E. Buckley,
per
Lehmann & Pattison,
Attys.

UNITED STATES PATENT OFFICE.

CHARLES E. BUCKLEY, OF AMENIA UNION, NEW YORK.

DEVICE FOR WATERING STOCK.

SPECIFICATION forming part of Letters Patent No. 445,920, dated February 3, 1891.

Application filed October 17, 1890. Serial No. 368,384. (No model.)

*To all whom it may concern:*

Be it known that I, CHARLES E. BUCKLEY, of Amenia Union, in the county of Dutchess and State of New York, have invented certain new and useful Improvements in Devices for Watering Stock; and I do hereby declare the following to be a full, clear, and exact description of the invention, such as will enable others skilled in the art to which it pertains to make and use it, reference being had to the accompanying drawings, which form part of this specification.

My invention relates to an improvement in devices for watering stock; and it consists in the construction and combination of parts which will be fully described hereinafter.

The object of my invention is to provide a device for conveying water from a supply-reservoir to a series of tanks, troughs, or buckets, which are placed in the several stalls of a stable or the different compartments or divisions of a yard or other suitable locality, and to place a valve in each tank or receptacle which will prevent the water from running out of the receptacles when it is being withdrawn from one or more of the other receptacles, and thus cause each receptacle to be supplied from the reservoir independently of the other receptacles, and to so construct the valves and their attachments that they will not clog up with sediment.

Figure 1 is a side elevation of a device which embodies my invention. Fig. 2 is an enlarged section taken through one of the receptacles and showing the preferred construction of the valve and its attachment. Fig. 3 is a similar view showing a modification in the construction of the valve. Fig. 4 is a detached perspective of the valve-seat shown in Fig. 2. Fig. 5 is a detached perspective of the cover used in connection with the valve shown in Fig. 3.

A reservoir A is secured to any suitable support within the stable or other compartment or locality and preferably at a distance from the stalls, and may or may not be provided with a cover, as desired. Water is fed to this reservoir through a supply-pipe B, which pipe is connected with any desired source. A pipe C is connected with the reservoir below the tops of the troughs for conducting the water away when it reaches this point in the reservoir, and thus preventing them from overflowing. Connected with the bottom of the reservoir and extending through its bottom a suitable distance is a main distributing-pipe D, and extending upward from this pipe D are a suitable number of pipes E, which connect at their upper ends with the bottoms of the receptacles or tanks F, which are secured to any suitable support within the stall, compartment, or division for the animal. Connected to the upper end of the distributing-pipe D, within the reservoir A, is a strainer G of any suitable construction to prevent dirt and sediment from passing into the pipe from the reservoir. As will be seen, the reservoir and the receptacles are about in a horizontal line, and that the water maintains the same height in the receptacles that it is in the reservoir, and as the water is continually running into the reservoir there is always a supply of water in the receptacles.

For the purpose of preventing the water from running out of the receptacles when water is being withdrawn from one of them by an animal drinking, I provide a check-valve H. By means of this construction each receptacle is resupplied directly from the supply-reservoir instead of partly from the other receptacles, as would otherwise be the case if a check-valve were not provided. This prevents to a great extent the spreading of contagious diseases by not allowing the water to run from the trough of one animal to that of another, as it would do if a check-valve were not provided.

As the animal carries considerable dirt upon its mouth after eating, in the way of hay, straw, or meal, an ordinary check-valve would soon become clogged or the seat become so covered with sediment that the valve would fail to close, and thus its object would not be accomplished. In order to prevent this I extend the pipes E, which pass into the receptacles up into them a suitable distance above their bottoms, as shown, so that the seats J of the valves are considerably above the bottoms of the receptacles, and place over these valves a cover or protector K, and forming around the outer side of the valve-seat a series of vertical grooves P. In this manner I place a cover over the valve, which affords a protector for it and prevents any dirt from settling upon it and affecting its operation; and as the sediment does not float and the valve-seat being above the bottoms of the receptacles, it will at once be seen that the valves are practically entirely protected from sediment, while a free inward flow of water is allowed. The valve seat and cover are tapered slightly, as shown, so that the cover K can be placed on the valve-seat and be held by frictional contact against the surfaces between the grooves thereof, which will allow of its being readily removed for the purpose of getting access to the valve, whenever desired.

While I here show and prefer to use a valve, yet, if desired, the valve can be omitted and the cover K act as a protector to the elevated inlet-opening, and thus prevent dirt, feed, straw, or sediment from entering and clogging the pipes, as it otherwise would do if a protector were not provided.

In Figs. 3 and 5 I show a slight modification of the valve seat and cover. In this instance the valve-seat is raised above the bottoms of the receptacle, as shown, and the cover K provided with a series of openings L around its lower edge, as shown in Fig. 5. This construction will accomplish the same result as the form above described, but is more expensive and is not so convenient to clean. A draw-off cock M is connected with the pipe D, by means of which the water from the pipes and the reservoir can be drawn off at any time, and also from the receptacles when the valves are removed.

By means of the construction above described it will be seen that a device is provided for watering stock which is very simple and cheap and in which the supply is drawn always from the supply-reservoir, which affords a fresh supply to them as fast as it is withdrawn, instead of partly from the other receptacles, and which is so constructed that it will not become inoperative because of dirt or sediment which is dropped from the animal's mouth.

Having thus described my invention, I claim—

1. In a device for watering stock, the combination, with a main reservoir and a distributing-pipe connected therewith, of a series of receptacles connected with the same distributing-pipe, inlet-pipes extending into the receptacles above their bottoms, a cover placed over the upper ends of the inlet-pipes, having a flange depending below the inlets, valves in the inlet-pipes and under the cover, and inlet-openings below the said valves, substantially as specified.

2. In a device for watering stock, the combination, with a main reservoir and a distributing-pipe connected therewith, of a receptacle, an inlet-pipe extending into the receptacle above its bottom, and a cover placed over the upper end of the pipe, having a flange depending below the inlet and inlet-passages, combined for the purpose described.

3. In a device for watering stock, the combination, with a main reservoir and a distributing-pipe connected therewith, of a receptacle, an inlet-pipe extending into and above the bottom of the receptacle having longitudinal grooves, and a cover having a depending flange and which is placed over the inlet-pipe, substantially as shown.

In testimony whereof I affix my signature in presence of two witnesses.

CHARLES E. BUCKLEY.

Witnesses:
S. BRASHEARS,
ALLEN S. PATTISON.